(12) United States Patent
Ito

(10) Patent No.: US 6,615,560 B2
(45) Date of Patent: *Sep. 9, 2003

(54) SIDING BOARDS ATTACHMENT STRUCTURE, SEALING MEMBER USED FOR THE SAME, SIDING BOARD, AND METHOD OF ATTACHING SIDING BOARDS

(75) Inventor: Hiroshi Ito, Nagoya (JP)

(73) Assignee: Nichiha Co., Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/891,662

(22) Filed: Jun. 27, 2001

(65) Prior Publication Data

US 2002/0046546 A1 Apr. 25, 2002

(30) Foreign Application Priority Data

Jun. 30, 2000 (JP) .......................... 2000-197997

(51) Int. Cl.⁷ .............. E04B 2/00; E04B 5/00; E04B 9/00
(52) U.S. Cl. ................ 52/506.06; 52/506.09; 52/509; 52/135; 403/381; 248/304; 248/220.21
(58) Field of Search .................. 52/506.06, 506.08, 52/506.09, 508, 509, 220.1, 223, 235, 506.01, 506.05; 403/381; 248/300, 301, 304, 220.21

(56) References Cited

U.S. PATENT DOCUMENTS 5,555,690 A * 9/1996 Cosentino ................ 52/235
6,158,915 A * 12/2000 Kise ...................... 403/2
6,289,646 B1 * 9/2001 Watanabe ................ 52/235
6,315,489 B1 * 11/2001 Watanabe ............. 248/220.21
6,341,463 B1 * 1/2002 Dickey et al. ............. 52/521

FOREIGN PATENT DOCUMENTS

| JP | 63-96143 | | 6/1988 | |
| JP | 5-32558 | | 4/1993 | |
| JP | 5-125812 | * | 5/1993 | .......... E04F/13/08 |
| JP | 5-133069 | * | 5/1993 | .......... E04F/13/08 |
| JP | 6-42138 | * | 2/1994 | .......... E04F/13/08 |
| JP | 6-158814 | | 6/1994 | |
| JP | 6-307059 | | 11/1994 | |
| JP | 8-302954 | | 11/1996 | |

* cited by examiner

Primary Examiner—Carl D. Friedman
Assistant Examiner—Chi Q Nguyen
(74) Attorney, Agent, or Firm—Oblon, Spivak, McClelland, Maier & Neustadt, P.C.

(57) ABSTRACT

A siding boards attachment structure includes siding boards, at least one underlayment, securing metal fittings and at least one sealing member. The sealing member is disposed between left and right adjacent siding boards and has a base plate portion, a rising plate portion, a front plate portion, and a front resilient material. The base plate portion is secured to the underlayment. The rising plate portion is bent forward from the base plate portion. The front plate portion is bent from a front end of the rising plate portion in the opposite direction from the base plate portion. The front resilient material is provided on a front surface of the front plate portion. The front plate portion engages with a front surface of the lateral underlying tongue portion of the siding board. The front resilient material is in tight contact with a front inner surface of the notched recess and a back surface of the lateral overlying tongue portion of the siding boards.

12 Claims, 18 Drawing Sheets

SIDING BOARDS ATTACHMENT STRUCTURE, SEALING MEMBER USED FOR THE SAME, SIDING BOARD, AND METHOD OF ATTACHING SIDING BOARDS

CROSS-REFERENCES TO RELATED APPLICATIONS

The present application claims priority under 35 U.S.C. §119 to Japanese Patent Application No.2000-197997, filed Jun. 30, 2000, entitled "SIDING BOARDS ATTACHMENT STRUCTURE, SEALING MEMBER USED FOR THE SAME, SIDING BOARD, AND METHOD OF ATTACHING SIDING BOARDS". The contents of this application are incorporated herein by reference in their entirety.

BACKGROUND OF THE INVENTION

1. Field of the Invention

The present invention relates to a siding boards attachment structure in which a siding board which has left and right shiplap or four sides shiplap is attached to an underlayment (for instance furring strips) using a securing metal fitting, and the invention also relates to a sealing member used therefor, a siding board and a method of attaching siding boards.

2. Discussion of the Background

Conventionally, there exists a siding boards attachment structure in which siding boards are attached to an underlayment and these siding boards are jointed with each other using shiplap joint structure on the left and right side or four side (left, right, upper and lower sides) of each siding board.

For example, a siding board 92 including a four side shiplap structure shown in FIG. 16 has an upper underlying tongue portion 922 formed on an upper side of the siding board 92, a lower overlying tongue portion 921 formed on a lower side of the siding board 92, a lateral underlying tongue portion 924 formed on a right side of the siding board 92 and a lateral overlying tongue portion 923 formed on a left side of the siding board 92. When upper and lower siding boards are jointed to each other, the lower overlying tongue portion 921 of the upper siding board 92 is superposed on the upper underlying tongue portion 922 of the lower siding board 92. When the left and right siding boards are jointed to each other, the lateral overlying tongue portion 923 of the right siding board 92 is superposed on the lateral underlying tongue portion 924 of the left siding board 92.

As shown in FIG. 16, usually, caulking material 929 is adhered on the flat surface of the upper underlying tongue portion 922 and the lateral underlying tongue portion 924 of the siding board 92. The back surfaces of lower overlying tongue portion 921 and the lateral overlying tongue portion 923 of one of the siding boards 92 press the caulking material 929 on the other siding boards, thereby preventing water from leaking from a gap of the joint portion of the siding boards 92.

In this case, the caulking material 929 is covered with the lower overlying tongue portion 921 or the lateral overlying tongue portion 923, and the caulking material 929 is not exposed from the front of the siding board. Therefore, it is possible to obtain a siding boards attachment structure which is excellent from the viewpoint of outward appearance design.

The siding boards 92 are fixed to each other using securing metal fittings 5. These securing metal fittings 5 are formed such that they can be fitted to an upper surface shape of the upper underlying tongue portion 922 and a back surface shape of the lower overlying tongue portion 921. These securing metal fittings 5 are disposed at connecting portions where four siding boards 92 are butted into one another so that each of the siding boards 92 is fixed to the underlayment such as furring strip mounted to a framework.

However, in actuality, even though the caulking material 929 for preventing inundation is adhered, an adverse possibility that rainwater and the like may be lead inside of the siding boards attachment structure 9 is not avoided completely.

That is, as shown in FIG. 17, rainwater 6 coming from a gap 927 of the joint portion between left and right two adjacent siding boards 92 is prevented from moving laterally (right in FIG. 17) by the caulking material 929, and the rainwater 6 passes through the gap 927 of the joint portion and falls downward.

However, the caulking material 929 adhered on the lateral underlying tongue portion 924 of the siding board 92 is not continuous in an opposed gap 928 to which the lateral underlying tongue portion 924 of the upper and lower siding boards 92. Therefore, when the rainwater 6 falling down through the gap 927 of the joint portion reaches the opposed gap 928, a portion of the rainwater 6 enters into the siding boards attachment structure 9.

More specifically, as shown in FIG. 18, in a construction state in which the securing metal fitting 5 is disposed at a corner of the siding board 92, the rainwater 6 falling down through the gap 927 of the joint portion passes through a front surface of a front flat plate 57 of the securing metal fitting 5, and further moves downward toward the gap 927 of the joint portion.

However, the front flat plate 57 is not necessarily in tight contact with the back surface of the lower overlying tongue portion 921 of the siding board 92 completely. Therefore, a portion of the rainwater 6 flows laterally through the front surface of the front flat plate 57 as shown in FIG. 18, falls on the upper underlying tongue portion 922 of the lower siding board 92 from a side end 59, and moves toward a backside of the siding board 92.

A portion of the rainwater 6 which has moved laterally through the front flat plate 57 moves laterally on a support portion 52 of the securing metal fitting 5 beyond the front flat plate 57, and moves toward a backside of the siding board 92 from the side end 59 of the securing metal fitting 5 similarly.

As a result, when the siding board 92 or the underlayment 3 is made of material having poor water resistance such as a ceramic type siding board or wood-based furring, this becomes a cause of corrosion and deterioration.

The rainwater 6 entering from the gap 926 of the joint portion of the upper and lower siding boards 92 is prevented from moving upward by the lateral caulking material 929 adhered on the upper underlying tongue portion 922, and is discharged forward from the wall surface.

Such an inconvenience can be naturally generated not only in the siding boards attachment structure which has four side shiplap joint, but also a siding boards attachment structure using siding boards having at least left and right shiplap structure.

SUMMARY OF THE INVENTION

An object of the present invention is to provide a siding boards attachment structure and a method of attaching siding boards capable of substantially preventing water from entering inside of the siding boards, and to provide a sealing member and a siding board used for the siding boards attachment structure.

According to one aspect of the invention, a siding boards attachment structure, includes siding boards, at least one underlayment, securing metal fittings and at least one sealing member. The siding board has opposite right and left sides and opposite upper and lower sides. The siding board is provided at the opposite right and left sides with a lateral underlying tongue portion and a lateral overlying tongue portion, respectively. The lateral underlying tongue portion protrudes along a direction from the left side to the right side in a back surface side. A notched recess is notched along a direction from the right side to the left side in front of the lateral underlying tongue portion. The lateral overlying tongue portion protrudes along a direction from the right side to the left side in a front surface side. The siding boards are attached to the underpayment. The securing metal fitting is disposed at the opposite upper and lower sides of the siding boards in order to fix the siding boards. The sealing member is disposed between left and right adjacent siding boards, having a base plate portion, a rising plate portion, a front plate portion and a front resilient material. The base plate portion is secured to the underlayment. The rising plate portion is bent forward from the base plate portion and abuts against a side surface of the lateral underlying tongue portion of the siding board. The front plate portion is bent from a front end of the rising plate portion in the opposite direction from the base plate portion. The front resilient material is provided on a front surface of the front plate portion. The front plate portion engages with a front surface of the lateral underlying tongue portion of the siding board. The front resilient material is in tight contact with a front inner surface of the notched recess and a back surface of the lateral overlying tongue portion of the siding boards.

According to another aspect of the invention, a sealing member used for a siding boards attachment structure, includes a base plate portion, a rising plate portion, a front plate portion and a front resilient material. The base plate portion is configured to be secured to an underlayment. The rising plate portion is bent forward from the base plate portion and is configured to abut against a side surface of the lateral underlying tongue portion. The front plate portion is bent from a front end of the rising plate portion in the opposite direction from the base plate portion and configured to engage with a front surface of the lateral underlying tongue portion of the siding board. The front resilient material is provided on a front surface of the front plate portion and configured to be in tight contact with a front inner surface of the notched recess of one of the siding board and a back surface of the lateral overlying tongue portion of the other siding board.

According to the other aspect of the invention, a siding board used for a siding boards attachment structure includes opposite right and left sides and opposite upper and lower sides, a lateral underlying tongue portion, a lateral overlying tongue portion and a notched recess. The lateral underlying tongue portion and the lateral overlying tongue portion are provided at the opposite right and left sides, respectively. The lateral underlying tongue portion protrudes along a direction from the left side to the right side in a back surface side. The lateral overlying tongue portion protrudes along a direction from the right side to the left side in a front surface side. The notched recess is notched along a direction from the right side to the left side in front of the lateral underlying tongue portion. The notched recess is formed such that portions of the front resilient material and the front plate portion of the sealing member can be fitted into the notched recess.

According to yet another aspect of the invention, a method of attaching siding boards, includes disposing securing metal fittings on the opposite upper and lower sides of a first row siding board, disposing the first row siding board on the underlayment using the securing metal fittings, bringing the rising plate portion of the sealing member into abutment against the lateral overlying tongue portion of the first row siding board, engaging the front plate portion of the sealing member with a front surface of the lateral underlying tongue portion, fitting the front resilient material and the front plate portion of the sealing member into the notched recess of the first row siding board, bringing the front resilient material into tight contact with a front inner surface of the notched recess, securing the sealing member to the underlayment, disposing the securing metal fitting on the opposite upper and lower sides of a second row siding board, disposing the second row siding board to the underlayment such that the sealing member is sandwiched between the first row siding board and the second row siding board, and bringing the front resilient material into tight contact with a back surface of the lateral overlying tongue portion of the second row siding board.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1:
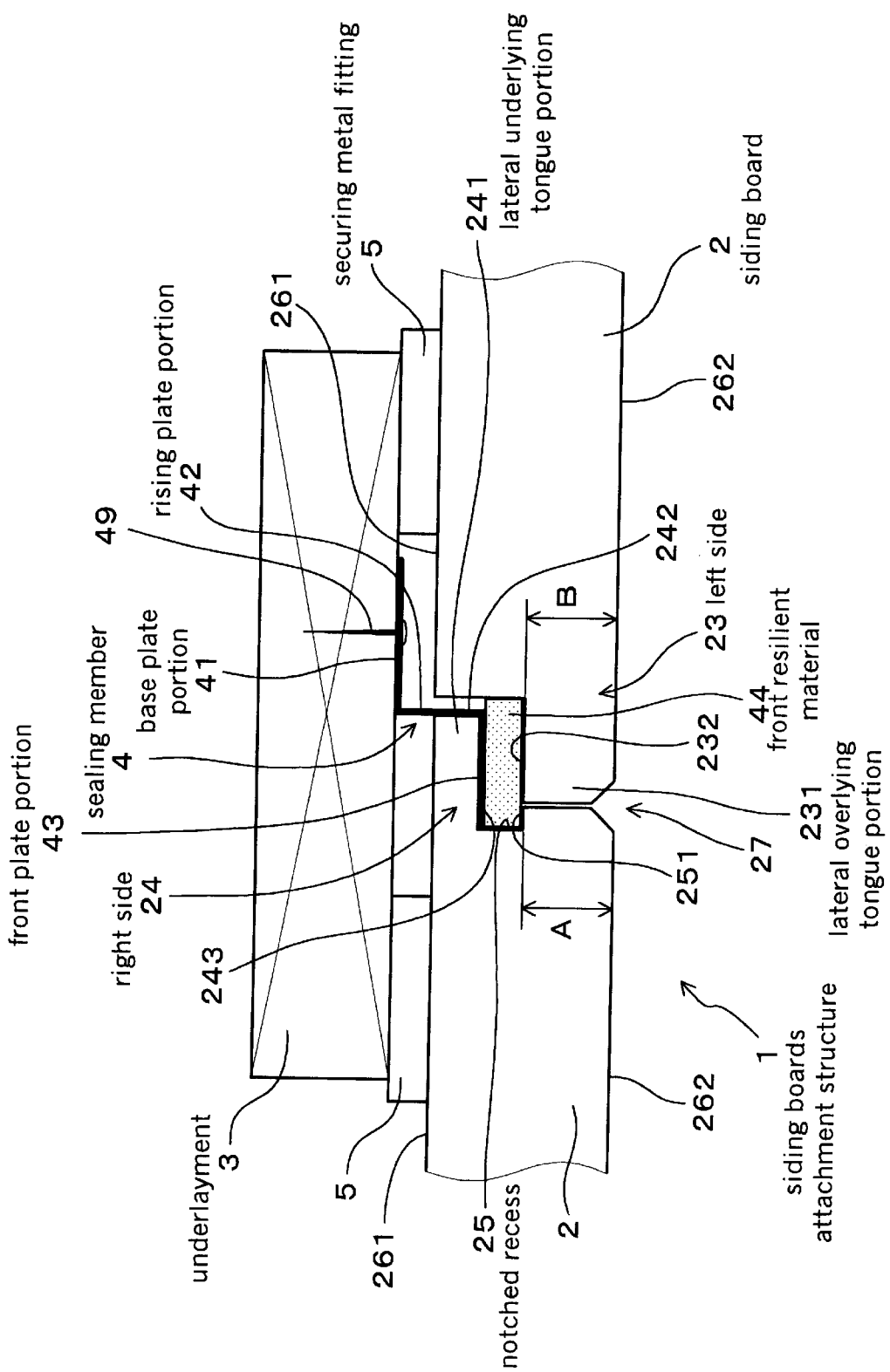
FIG. 1 is a transverse sectional view of a siding boards attachment structure of a first embodiment.

The preferred embodiments will now be described with reference to the accompanying drawings, wherein like reference numerals designate corresponding or identical elements throughout the various drawings.

In the present specification, the outward direction of the architecture is called "front", and the inward direction of the architecture is called "rear". Concerning the sealing member and the securing metal fitting, in a state in which they are mounted to the underlayment, the outward direction of the architecture is called "front", and the inward direction of the architecture is called "rear".

First Embodiment

A siding boards attachment structure, a sealing member used therefor, a siding board and a method of attaching siding boards according to a first embodiment of the present invention will be explained using FIGS. 1 to 10.

Figure 2:
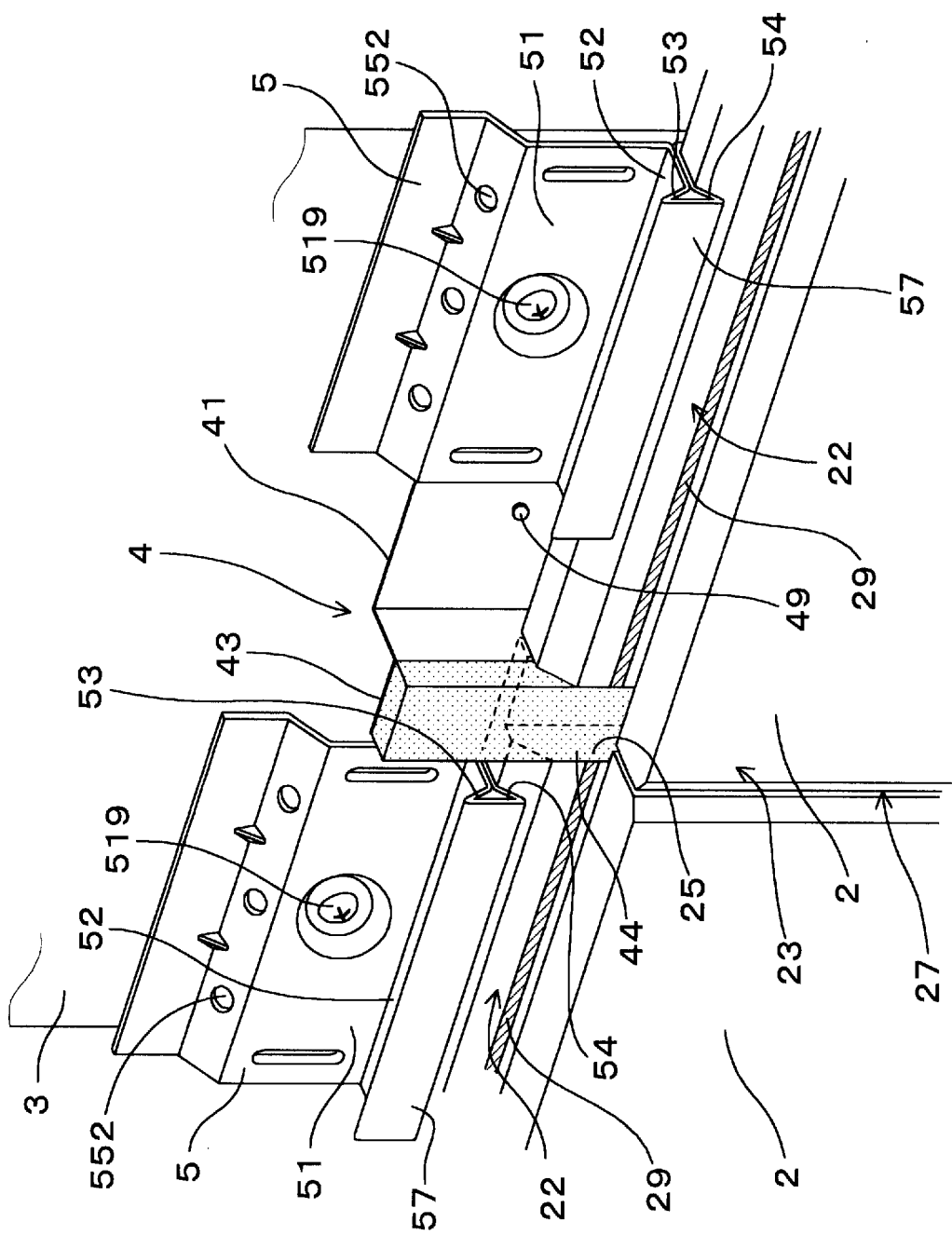
FIG. 2 is a perspective view of the siding boards attachment structure of the first embodiment.

FIG. 1 is a transverse sectional explanatory view of a siding boards attachment structure 1 of the present embodiment centering on a left and right shiplap joint portion. FIG. 2 is a perspective view thereof, FIG. 3 is a perspective view showing a siding board 2 which is a constituent element of the siding boards attachment structure 1 shown in FIGS. 1 and 2.

As shown in FIGS. 1 and 2, the siding boards attachment structure 1 of the present embodiment includes the siding boards 2 (FIG. 3) each provided at opposite right and left sides 24, 23 with a lateral underlying tongue portion 241 and a lateral overlying tongue portion 231, respectively. The siding boards 2 are joined to each other in left and right shiplap manner. Securing metal fittings 5 are disposed on upper and lower side of the siding board 2, i.e., an upper underlying tongue portion 22 and a lower overlying tongue portion 21. And the siding boards 2 are attached to an underlayment 3.

Figure 3:
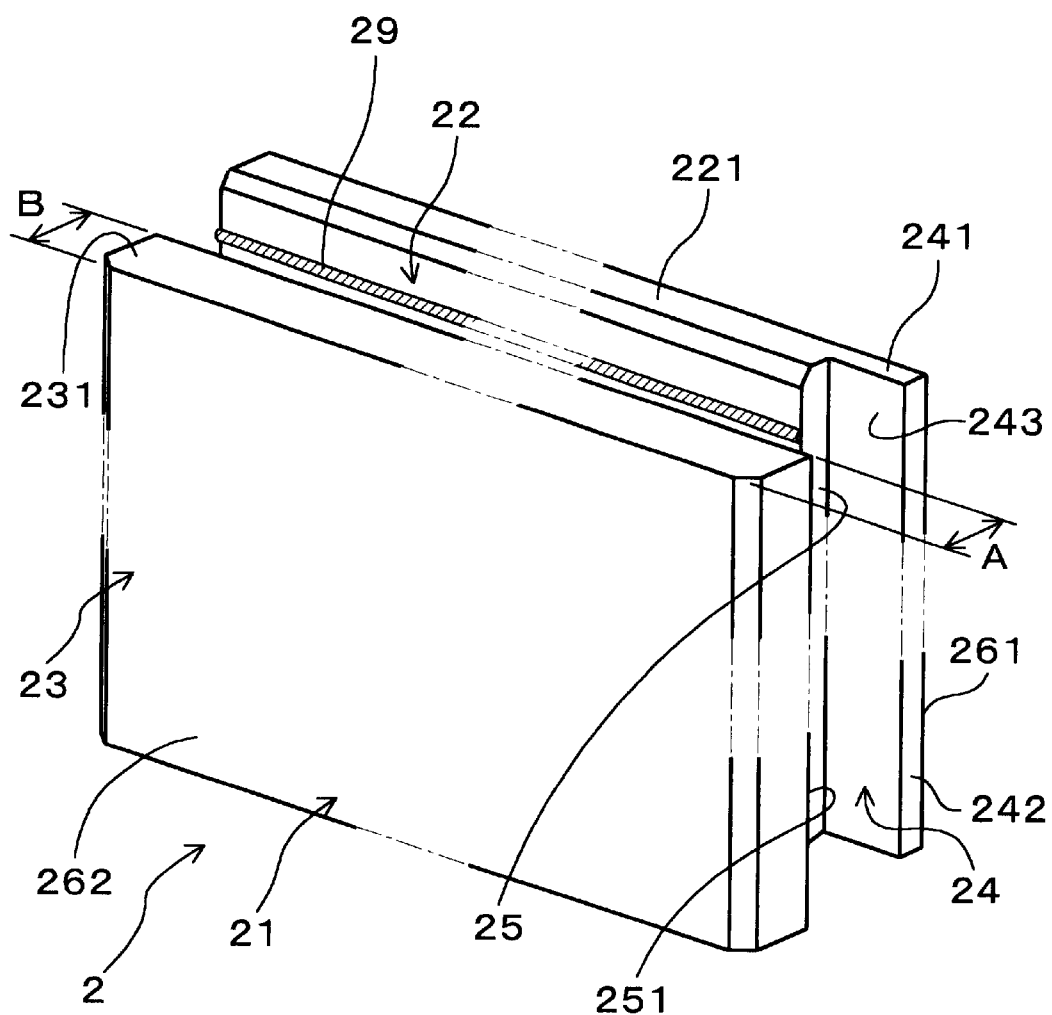
FIG. 3 is a perspective view of a siding board of the first embodiment.

As shown in FIGS. 1 and 3, the lateral underlying tongue portion 241 of the siding board protrudes along a direction from the left side 23 to the right side 24 in a back surface side. And the siding board 2 has a notched recess 25 at the right side 24. The notched recess 25 is notched along a direction from the right side 24 to the left side 23 in front of the lateral underlying tongue portion 241. The lateral overlying tongue portion 231 protrudes along a direction from the right side 24 to the left side 23 in the front surface side.

Figure 4:
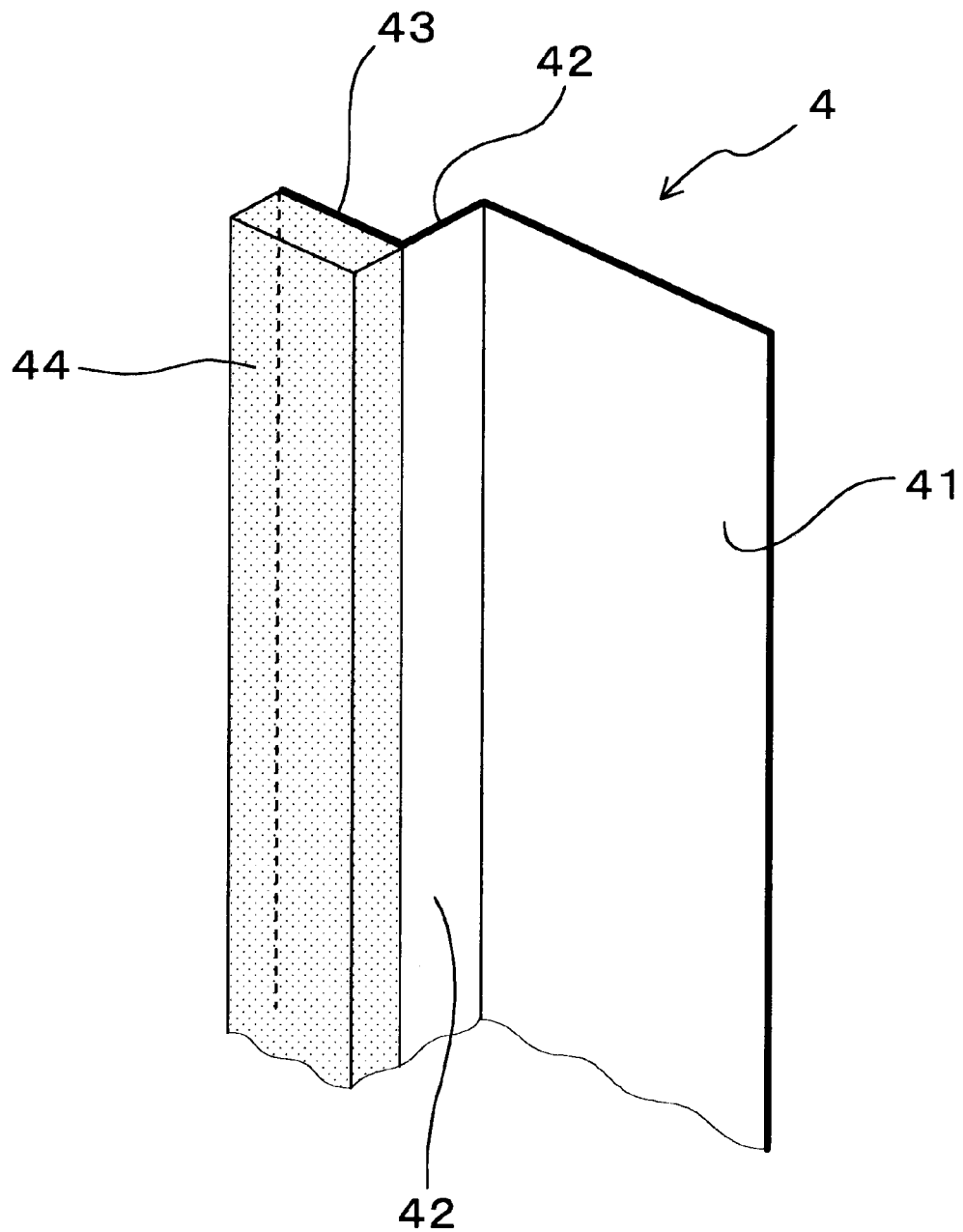
FIG. 4 is a perspective view of a sealing member of the first embodiment.

As shown in FIGS. 1, 2 a sealing member 4 is disposed between the left and right adjacent siding boards 2. FIG. 4 is a perspective view of the sealing member 4.

As shown in FIGS. 1, 2 and 4, the sealing member 4 includes a base plate portion 41, a rising plate portion 42, a front plate portion 43 and a front resilient material 44. The base plate portion 41 is configured to be secured to the underlayment 3. The rising plate portion 42 is bent forward from the base plate portion 41. The front plate portion 43 is bent from a front end of the rising plate portion 42 in the opposite direction from the base plate portion 41. The front plate portion 43 is provided at its front surface with the front resilient material 44.

As shown in FIG. 1, the rising plate portion 42 abuts against a side surface of the lateral underlying tongue portion 241, and the front plate portion 43 engages a front surface of the lateral underlying tongue portion 241 of the siding board 2.

The front resilient material 44 is in tight contact with a front inner surface 251 of the notched recess 25 of one of the siding boards 2, and is in tight contact with a back surface 232 of the lateral overlying tongue portion 231 of the other siding board 2.

Figure 8:
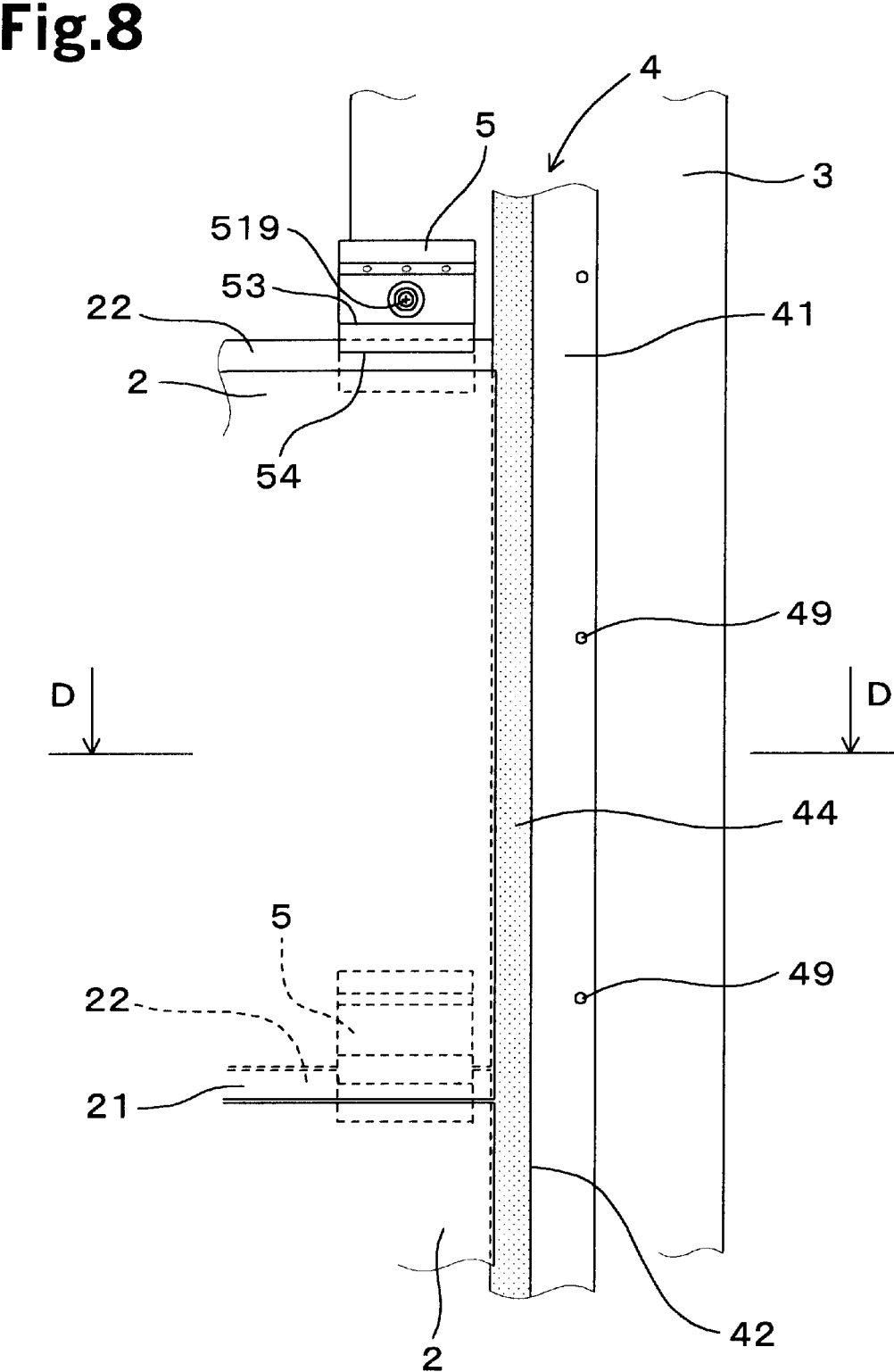
FIG. 8 is a front view showing a second step completed state of the method of attaching siding boards of the first embodiment.

The sealing member 4 is disposed continuously with the siding boards attachment structure 1 over the vertical direction (FIG. 8).

Figure 5:
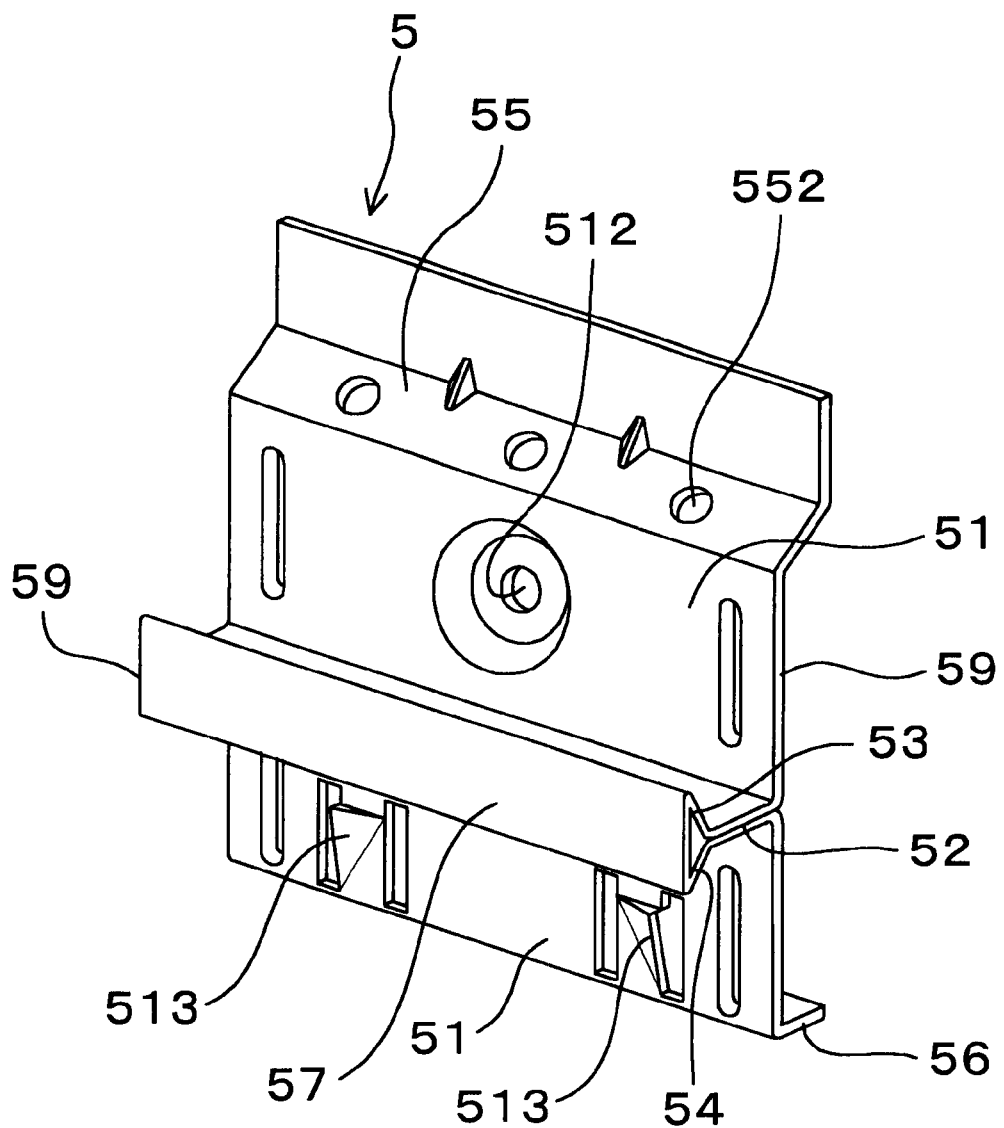
FIG. 5 is a perspective view of a securing metal fitting of the first embodiment.
Figure 6:
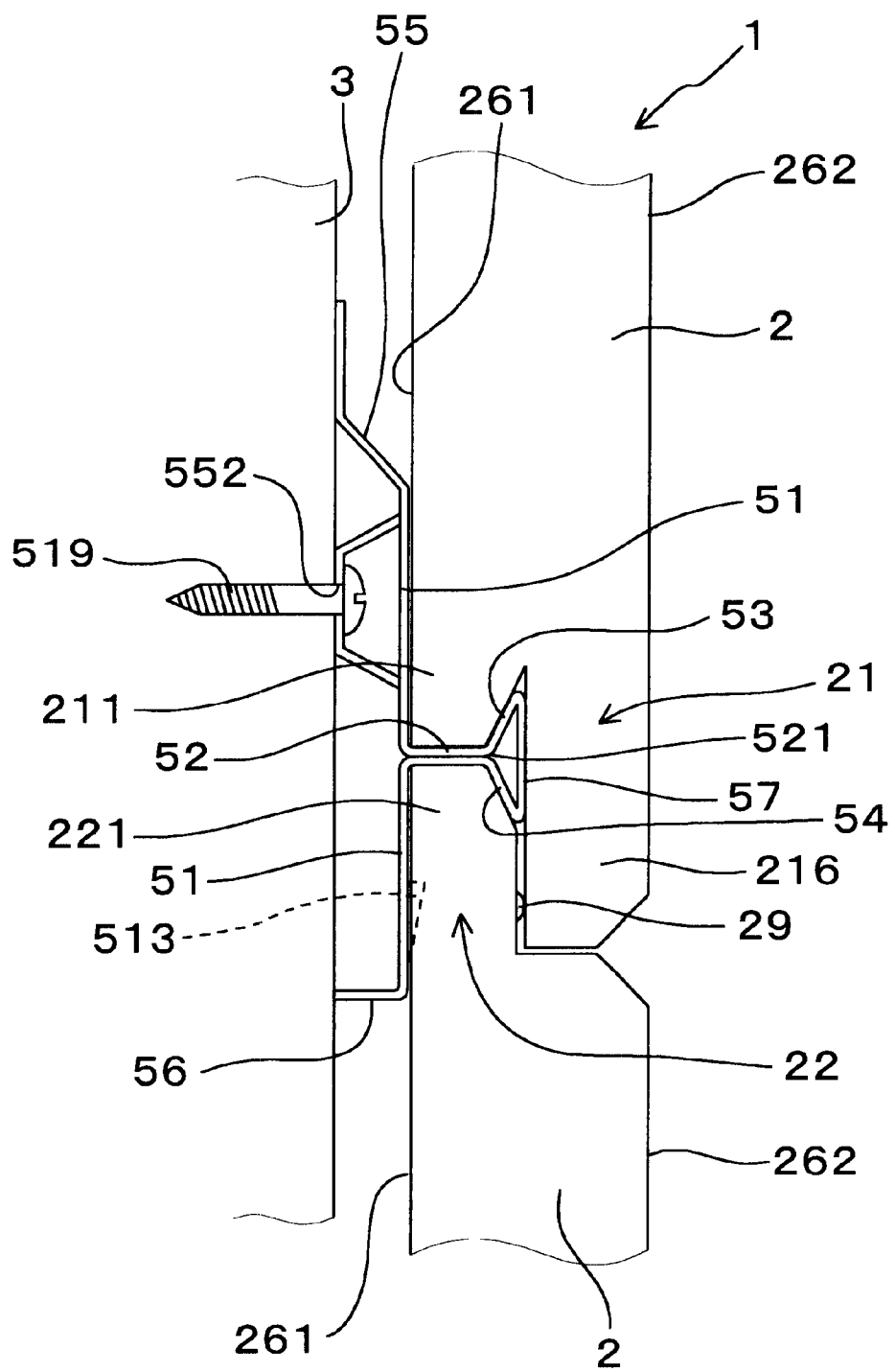
FIG. 6 is a longitudinal explanatory diagram of a siding boards attachment structure of upper and lower shiplap joint portion of the first embodiment.

FIG. 5 is a perspective view showing the securing metal fitting 5, and FIG. 6 is a longitudinal sectional view of a joint portion of the upper and lower siding boards 2 using the securing metal fitting 5.

As shown in FIGS. 5 and 6, the securing metal fitting 5 has a securing plate 51 configured to be abutted against a back surface 261 of the vertically arranged siding boards 2, and a supporting portion 52 rising in front of the securing plate 51 over the entire width thereof. The support portion 52 is formed at its front end 521 with an upper board engaging portion 53 bent diagonally upwardly, and a lower board engaging portion 54 bent diagonally downwardly. The front flat plate 57 is continuously formed between tip ends of the upper board engaging portion 53 and the lower board engaging portion 54.

The securing plate 51 is provided at its upper end with a step portion 55 which is retreated diagonally rearwardly, and at its lower end with a bent portion 56 which is bent rearwardly through about 90°. The securing plate 51 is formed with screw holes 512 through which a screw 519 to be secured to the underlayment 3 passes. The step portion 55 is also formed with through holes 55. A needle or the like may pass through the through hole 552 to secure the securing metal fitting 5 to the underlayment 3.

To engage the securing metal fitting 5 with the lower siding board 2, as shown in FIG. 6, the upper underlying tongue portion 221 is fitted between the securing plate 51 and the lower board engaging portion 54 of the support portion 52. In this state, the screw 519 is threadedly inserted into the underlayment 3 and secured to the underlayment 3.

Next, to engage the upper siding board 2 with the securing metal fitting 5, as shown in FIG. 6, a fitting portion 211 located on back side of the lower overlying tongue portion 21 is fitted between the support portion 52 and the upper board engaging portion 53 of the securing plate 51 of the securing metal fitting 5. Then, the lower overlying tongue portion 21 is brought into abutment against the front flat plate 57.

As shown in FIG. 5, the securing plate 51 is provided at its lower portion with a couple of recutangular cantilever portions 513 which are cut forward. As shown in FIG. 6, each of the recutangular cantilever portions 513 bites in the back surface 261 of the lower siding board 2 to prevent its lateral movement to enhance the securing force.

As shown in FIG. 3, the siding board 2 has a four sides shiplap structure having the upper underlying tongue portion 221 and the lower overlying tongue portion 216 in addition to the lateral underlying tongue portion 241 and the lateral overlying tongue portion 231.

As shown in FIG. 1, a thickness (A) of the siding board 2 from its front inner surface 251 of the notched recess 25 to a front surface of the siding board 2 is substantially equal to a thickness (B) of the lateral overlying tongue portion 231.

As shown in FIG. 3, caulking material 29 is attached on a front surface of the upper underlying tongue portion 221 of the siding board 2, but no caulking material is attached on the lateral underlying tongue portion 241.

As shown in FIG. 4, the sealing member 4 is formed with the base plate portion 41, the rising plate portion 42 and the front plate portion 43 by bending a metal plate such as stainless steel. The resilient material 44 adhered on a surface of the front plate portion 43 is a closed-celled foam material made of EPDM or the like.

Figure 7:
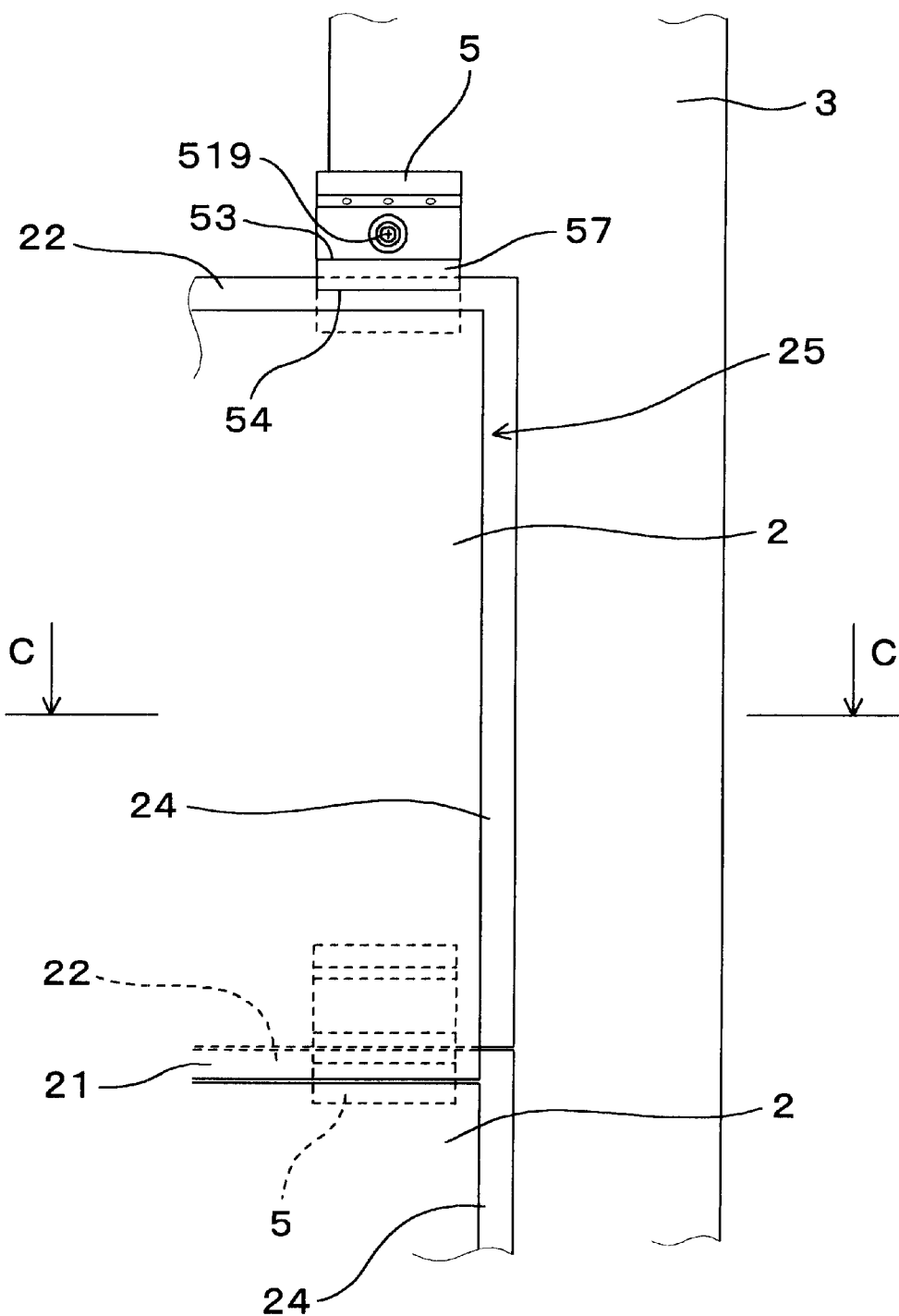
FIG. 7 is a front view showing a first step completed state of a method of attaching siding boards of the first embodiment.
Figure 9:
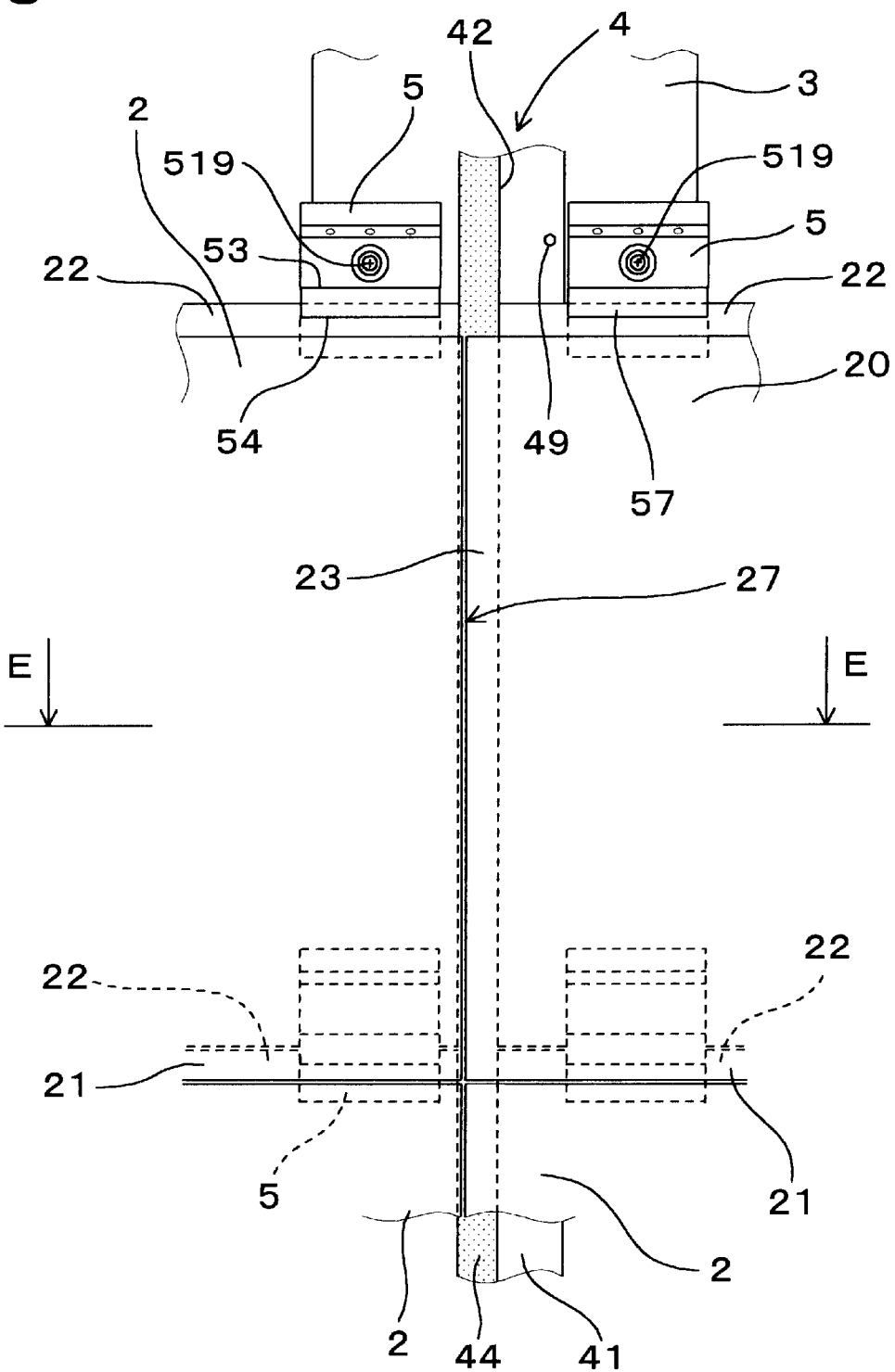
FIG. 9 is a front view showing a third step completed state of the method of attaching siding boards of the first embodiment.
Figure 10A:
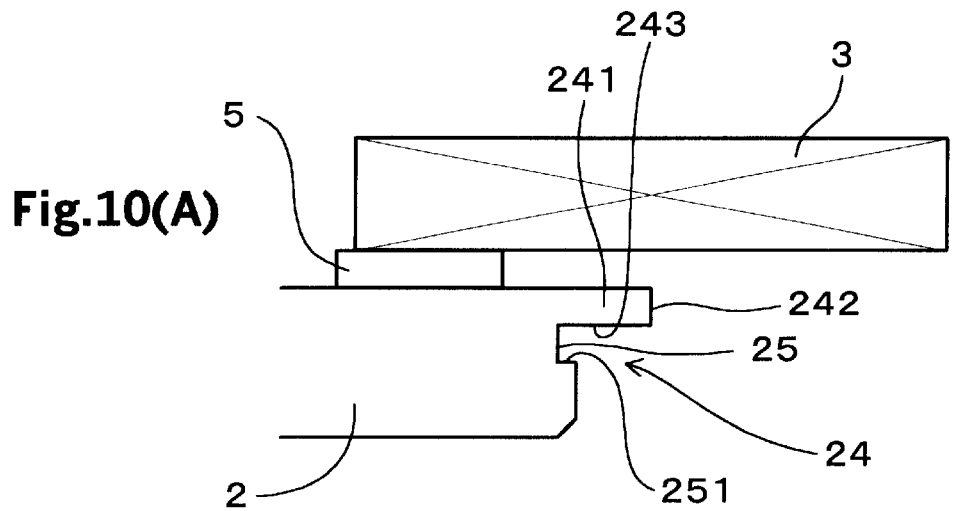
FIG. 10(A) is a sectional explanatory view taken along the arrow C—C in FIG. 7.
Figure 10B:
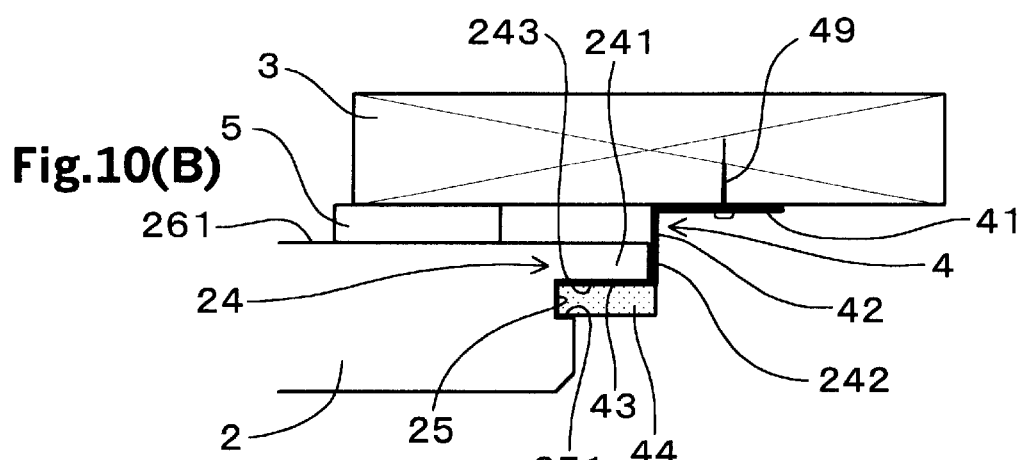
FIG. 10(B) is a sectional explanatory view taken along the arrow D—D in FIG. 8.
Figure 10C:
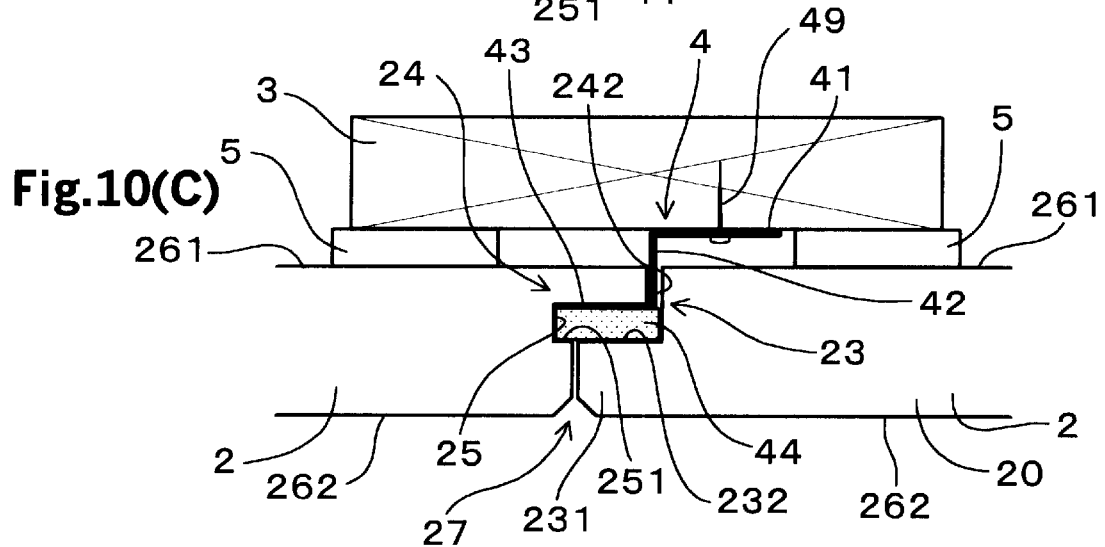
FIG. 10(C) is a sectional explanatory view taken along the arrow E—E in FIG. 9.

Next, a construction method of the siding boards attachment structure 1 will be explained using FIGS. 7 to 10. FIGS. 7 to 9 are front views of a construction state, and FIG. 10 is a transverse sectional view of the construction state. Partway construction by the method of attaching siding boards will be explained below.

The method of attaching siding boards includes the following first to third steps In the first step, as shown in FIGS. 6, 7 and 10 (A), the securing metal fitting 5 is disposed on the upper underlying tongue portion 221 and the lower overlying tongue portion 216 of the siding board 2, and a first row siding board 2 is disposed on the underlayment 3. The securing metal fitting 5 is secured to the underlayment 3 by the screw 519.

In the second step, as shown in FIGS. 8 and 10 (B), the sealing member 4 is secured to the underlayment 3. At that time, the rising plate portion 42 of the seal metal fitting 4 is brought into abutment against the side surface 242 of the lateral underlying tongue portion 241 of the first row siding board 2, and the front plate portion 43 of the sealing member 4 is brought into engagement with the front surface 243 of the lateral underlying tongue portion 241.

The front resilient material 44 and the front plate portion 43 of the sealing member 4 are fitted into the notched recess 25 of the first row siding board 2 to bring the front resilient material 44 into tight contact with the front inner surface 251 of the notched recess 25 (FIG. 10 (B)).

As shown in FIGS. 8 and 10 (B), the sealing member 4 is secured to the underlayment 3 by striking nails 49 at a plurality of locations at appropriate distances from one another.

In the third step, as shown in FIGS. 9 and 10 (C), the second row siding board 2 is disposed on the right side of the first row siding board 2. The securing metal fittings 5 are disposed on the upper underlying tongue portion 221 and the lower overlying tongue portion 216 of the second row siding board 2 and the second row siding board 2 is attached to the underlayment 3. The second row sideing board 2 is attached such as to sandwich the sealing member 4 between the first row siding board 2 and the second row siding board 2.

At that time, the front resilient material 44 is brought into tight contact with the back surface 232 of the lateral overlying tongue portion 231 of the second row siding board 2.

When material whose peripheral surface is strapped and supplied in a compressed state is used as the front resilient material 44, the strap is released at the time of construction. With this, the front resilient material 44 swells and sufficiently spreads into the space between the lateral underlying tongue portion 241 and the lateral overlying tongue portion 231 of the siding board 2. Therefore, it is possible to tightly close the gap 27 of the joint portion of the left and right siding boards 2 from back surface side, and to reliably prevent water from entering.

The securing metal fitting 5 may be secured such as to be superposed on the base plate portion 41 of the sealing member 4 as will be described later.

Next, the working effect of the present embodiment will be explained.

As shown in FIG. 1, in the siding boards attachment structure 1, the front resilient material 44 of the sealing member 4 disposed between the adjacent two siding boards 2 is in tight contact with the front inner surface 251 of the notched recess 25 of one of the siding boards 2 and the back surface 232 of the lateral overlying tongue portion 231 of the other siding board 2.

Therefore, the gap 27 of the joint portion of the left and right siding boards 2 is tightly closed from the back surface side of the siding board 2. Therefore, rainwater should not go to back surface 261 of the siding board 2 or enter the structure body such as the underlayment 3.

As described above, according to the siding boards attachment structure 1, it is possible to substantially prevent rainwater from entering the siding boards attachment structure 1, and to substantially prevent the corrosion and deterioration of the siding board 2 and the underlayment 3.

The sealing member 4 is disposed continuously with the siding boards attachment structure 1 over the underlayment 3 in the vertical direction. Therefore, there is almost no room for rainwater to enter from the gap 27 of the joint portion, and it is possible to prevent rainwater from entering more substantially.

In the sealing member 4, the base plate portion 41 thereof is secured to the underlayment 3, the rising plate portion 42 abuts against the side surface 242 of the lateral underlying tongue portion 241 of the siding board 2. Therefore, the rising plate portion 42 functions as a stopper for the siding board 2 against lateral deviation. At the time of construction, since the rising plate portion 42 abuts against the side surface 242 of the lateral underlying tongue portion 241 of the first row siding board 2 to mount the sealing member 4, the lateral positioning of the sealing member 4 can easily be carried out (see FIG. 10(B)).

Further, since the front resilient material 44 is a closed-celled foam material made of, for example, EPDM or the like, it is possible to prevent rainwater from entering more substantially.

As shown in FIG. 3, the thickness (A) of the siding board 2 from its front inner surface 251 of the notched recess 25 to a front surface 262 of the siding board 2 is substantially equal to the thickness (B) of the lateral overlying tongue portion 231.

Therefore, it is possible to substantially bring the front resilient material 44 of the sealing member 4 into tight contact with the back surfaces 261 of the left and right siding boards 2 of the gap 27 of the joint portion, and to ensure the outward appearance design of the siding boards attachment structure 1.

That is, in order to secure the outward appearance design, the left and right siding boards 2 are attached to the underlayment such that the front surfaces 262 which become a design surface is substantially flush with each other. Since the thickness (A) and the thickness (B) are substantially the same, the left and right siding boards 2 can be disposed such that the front inner surface 251 of the notched recess 25 and the back surface 232 of the lateral overlying tongue portion 231 are substantially the same plane as shown in FIG. 1.

With this structure, it is possible to substantially bring the foam resilient material 44 of the sealing member 4 into tight contact with both the front inner surface 251 of the notched recess 25 of each of the siding boards 2 and the back surface 232 of the lateral overlying tongue portion 231.

Therefore, by using the siding board 2, it is possible to obtain a siding boards attachment structure 1 which is capable of substantially preventing water from entering into the siding boards attachment structure, and which has excellent outward appearance design.

Further, as shown in FIG. 3, the siding board 2 has a four side shiplap structure, it is possible to obtain a siding boards attachment structure 1 which has excellent outward appearance design, and excellent construction efficiency.

Second Embodiment

Figure 12:
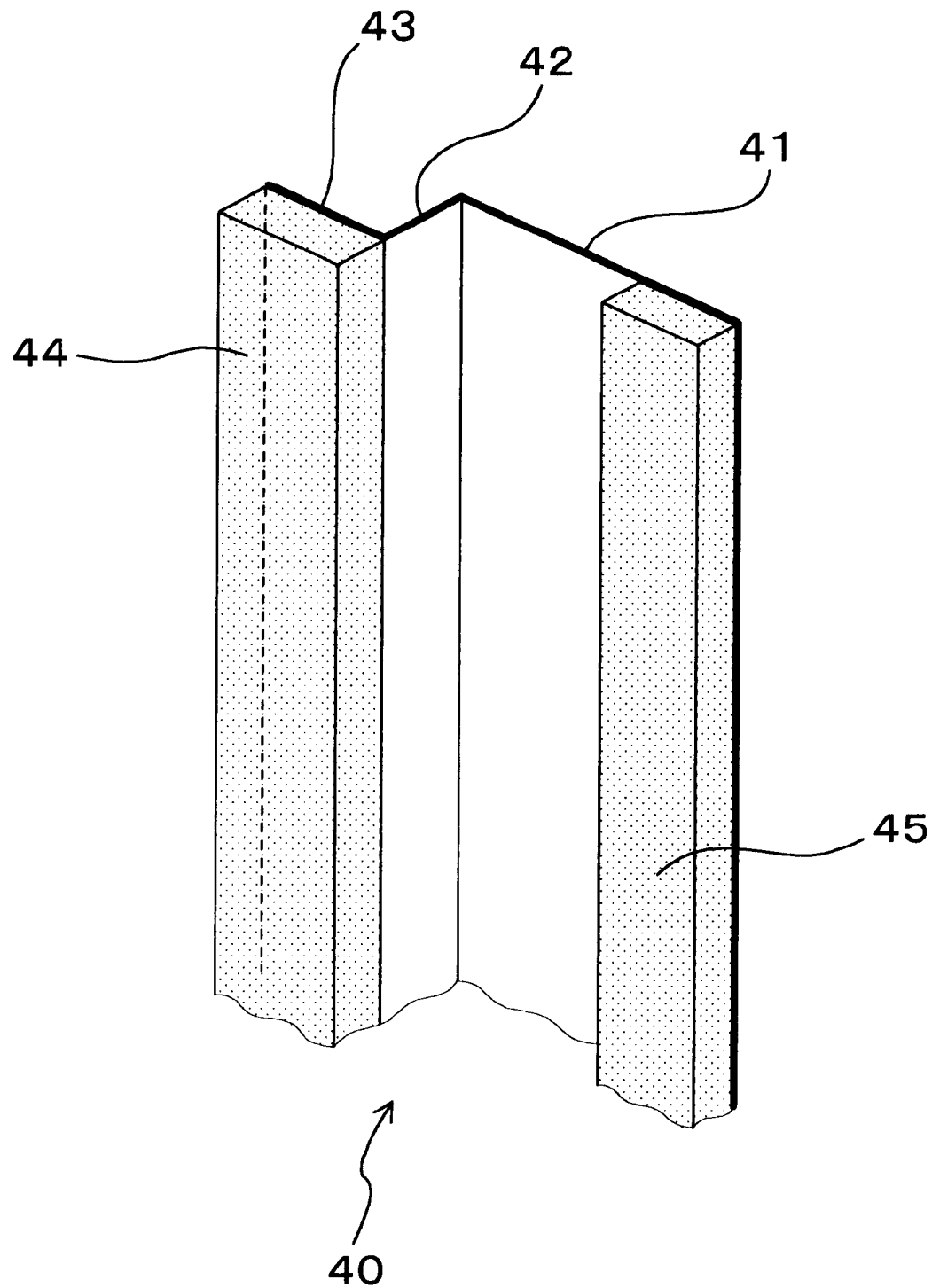
FIG. 12 is a perspective view of a sealing member of the second embodiment.

A second embodiment is an example of a sealing member 40 (FIG. 12) in which a rear resilient material 45 is provided on a front surface of a base plate portion 41 of the sealing member 4 over the vertical direction, a siding boards attachment structure 10 and a method of attaching siding boards.

Figure 11:
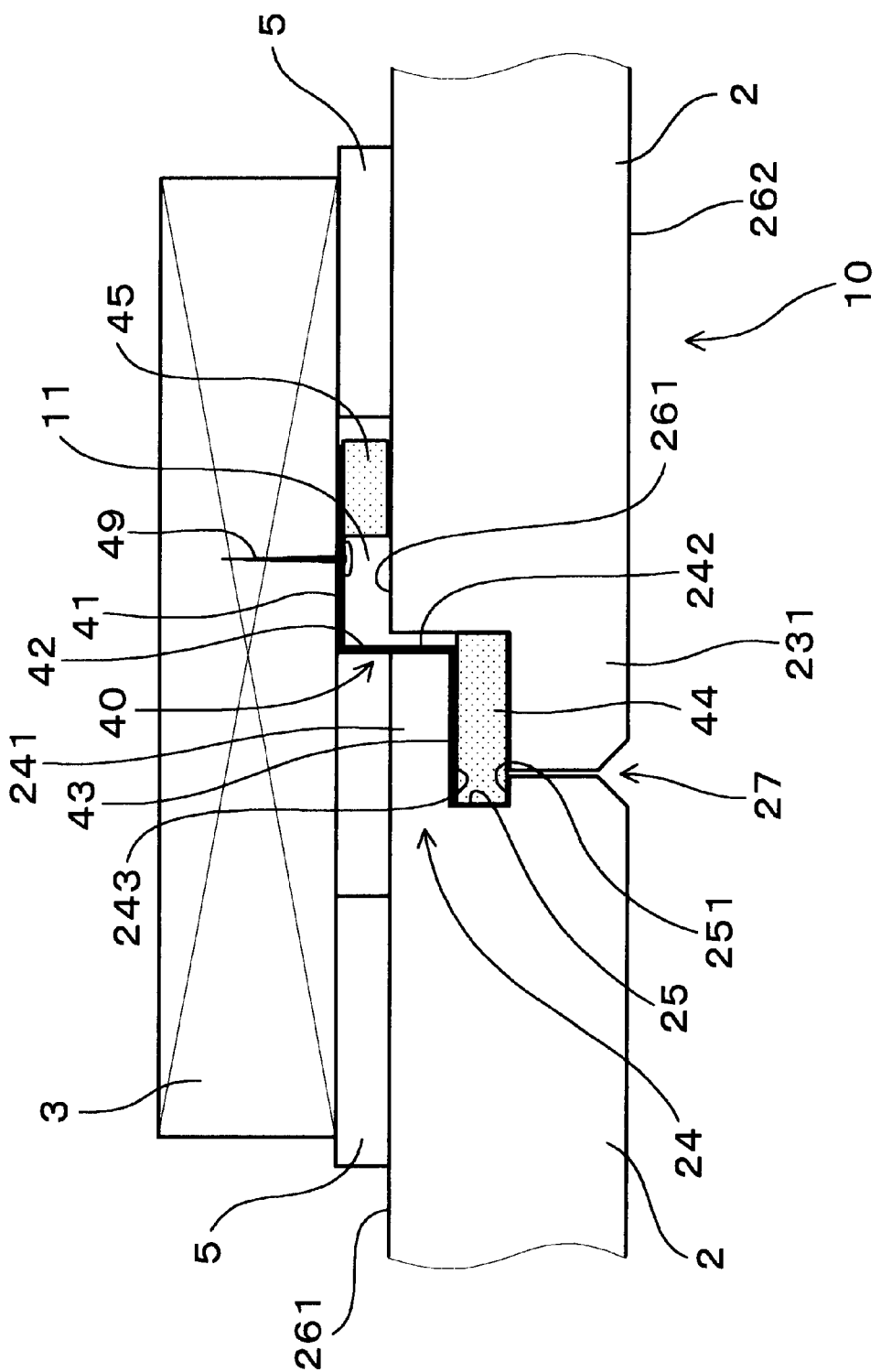
FIG. 11 is a transverse sectional view of a siding boards attachment structure of a second embodiment.
Figure 13:
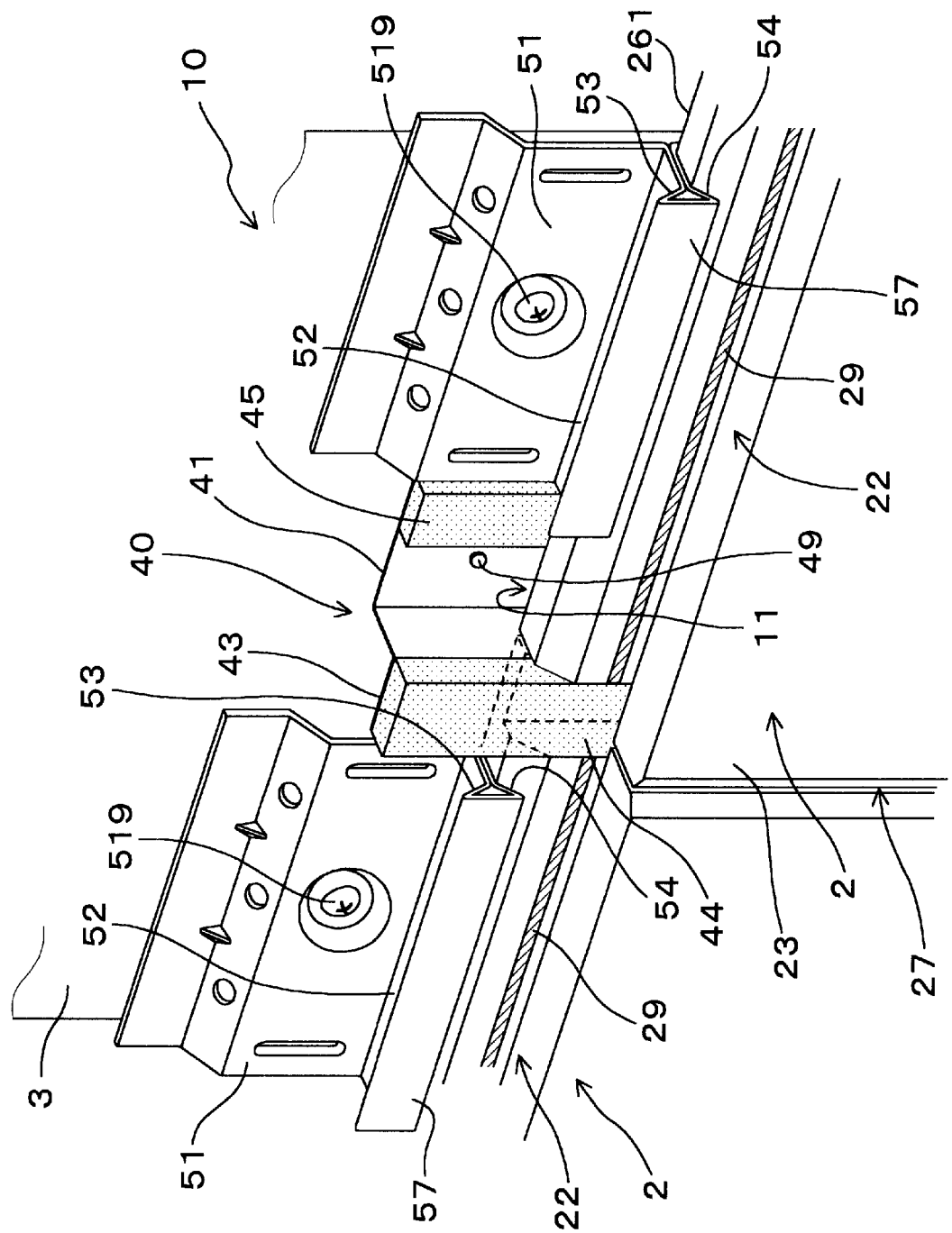
FIG. 13 is a perspective view of the siding boards attachment structure of the second embodiment.

In the siding boards attachment structure 10, as shown in FIGS. 11 and 13, the rear resilient material 45 is in tight contact with the back surface 261 of the second row (right) siding board 2.

Further, the rear resilient material 45 is made of, for example, the same material as that of the front resilient material 44 shown in the first embodiment. The siding boards attachment structure 10 of the present embodiment is the same as that of the first embodiment except that the rear resilient material 45 is in tight contact with the back surface 261 of the second row (right) siding board 2.

As shown in FIGS. 11 and 13, the base plate portion 41 of the sealing member 40, the rear resilient material 45, the rising plate portion 42, the front resilient material 44 and the siding board 2 form a water passage 11.

Therefore, in the unlikely event that the front resilient material 44 of the sealing member 40 could not prevent water from entering and rainwater invaded from the gap 27 of the joint portion of the siding boards 2, the rear resilient material 45 can dam up the rainwater. Then, the rainwater passes through the water passage 11 and falls down, and should not enter the siding boards attachment structure 10.

With this structure, it is possible to prevent water from entering the siding boards attachment structure 10 more substantially.

Other portion of the second embodiment has the same working effect as that of the first embodiment.

Third Embodiment

Figure 14:
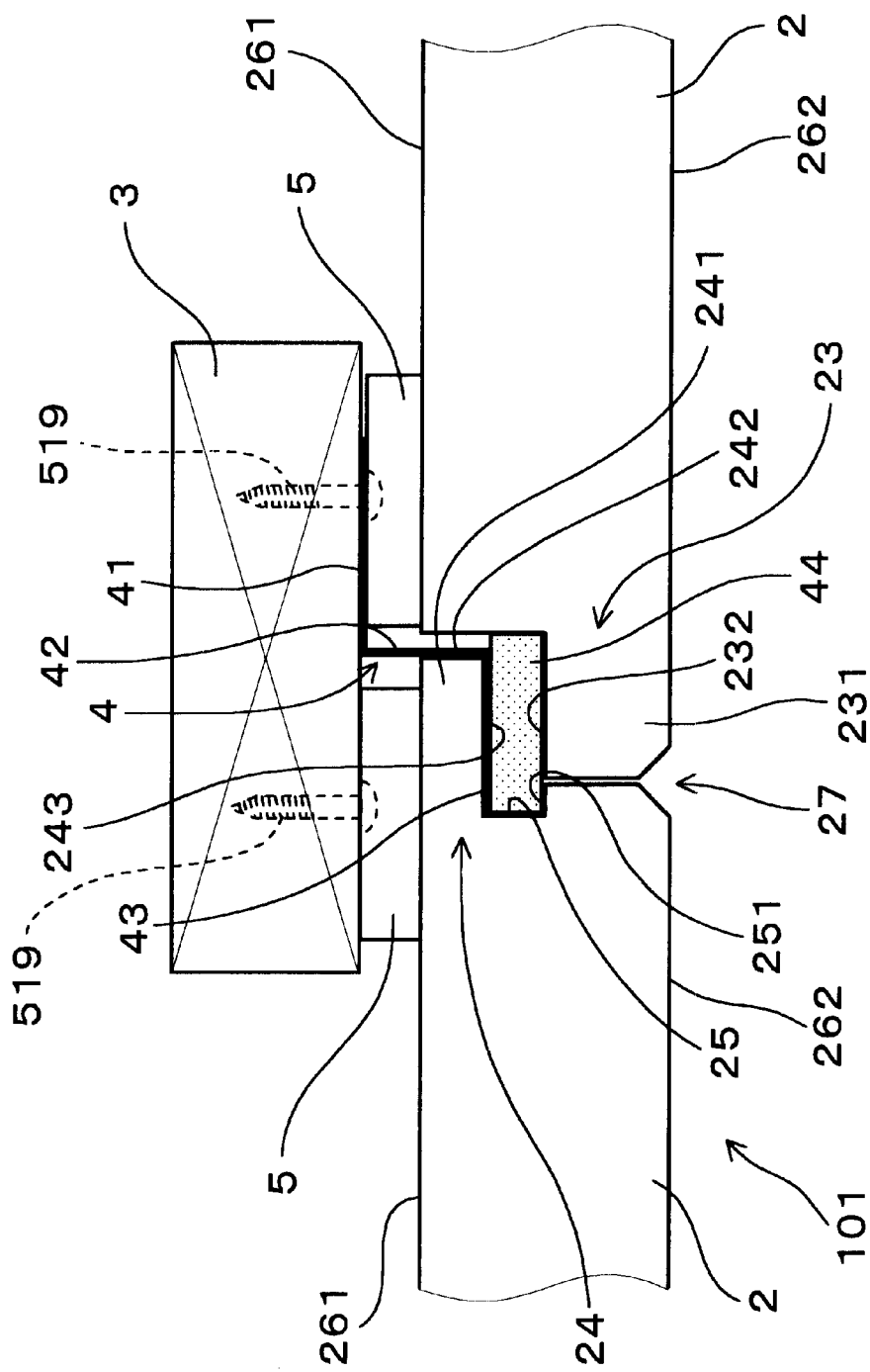
FIG. 14 is a transverse sectional view of a siding boards attachment structure of a third embodiment.

A third embodiment is an example of a siding boards attachment structure 101 in which the base plate portion 41 of the sealing member 4 is sandwiched between a rear portion of the securing metal fitting 5 and the underlayment 3 as shown in FIG. 14.

That is, one of the securing metal fittings 5 disposed on the opposite sides of the sealing member 4 is superposed on a front surface of the base plate portion 41 of the sealing member 4 and secured to the underlayment 3.

The securing metal fitting 5 is secured to the underlayment 3 together with the sealing member 4 by a screw 519.

Other portion of the third embodiment is the same as that of the first embodiment.

In this case, it is possible to reduce a securing space of the securing metal fitting 5. Therefore, as shown in FIG. 14, even when the width of the underlayment 3 in the lateral direction is small, it is possible to easily and substantially secure the securing metal fitting 5.

For example, when the underlayment 3 is a vertical body edge having a small width, it is possible to easily and substantially secure the securing metal fitting 5 to the underlayment 3.

Further, the securing metal fitting 5 and the sealing member 4 can be secured at the same time by means of a screw or the like. Therefore, it is possible to reduce the number of steps of the method of attaching siding boards, and to enhance the construction efficiency.

Figure 15:
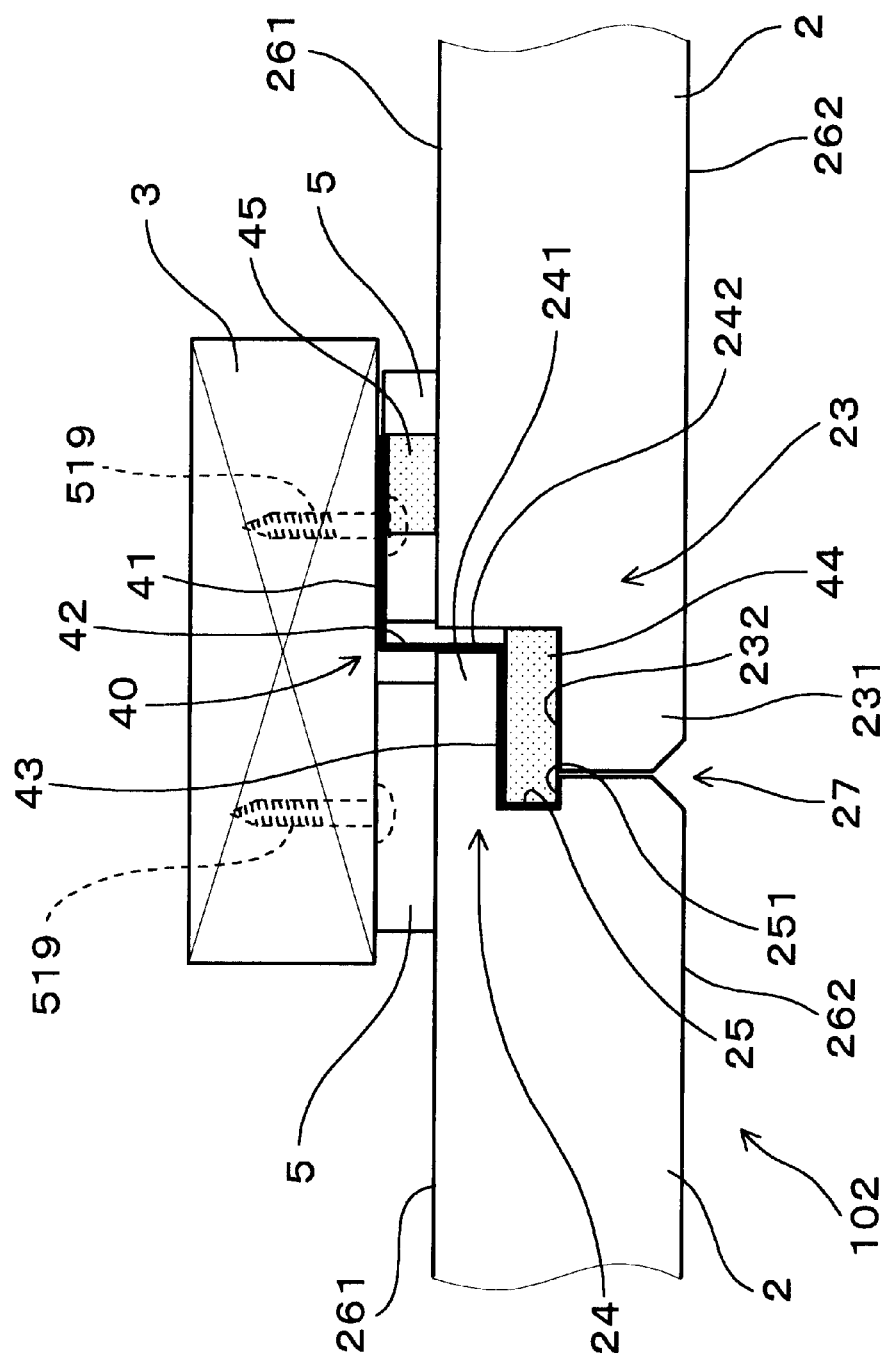
FIG. 15 is a transverse sectional view of a siding boards attachment structure of a fourth embodiment.
Figure 16:
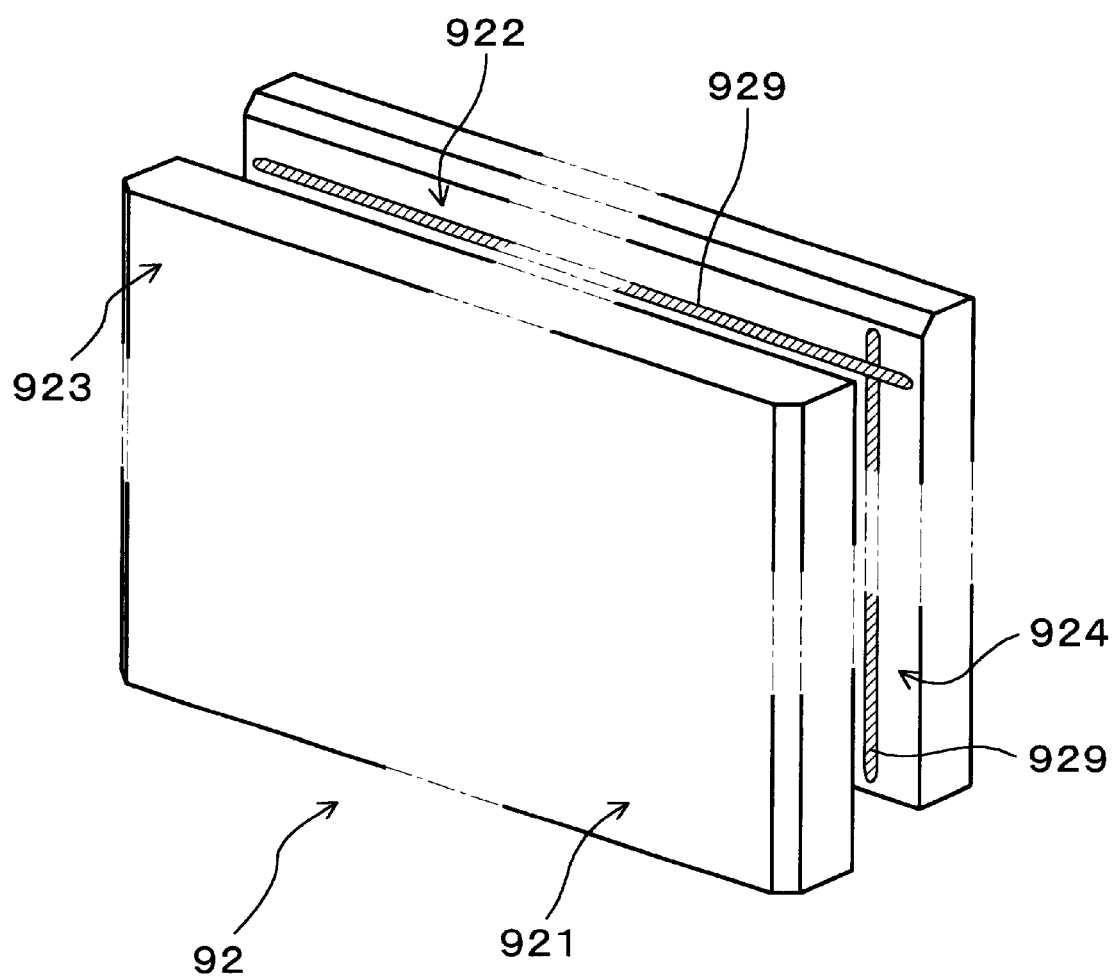
FIG. 16 is a perspective view of a conventional siding board.
Figure 17:
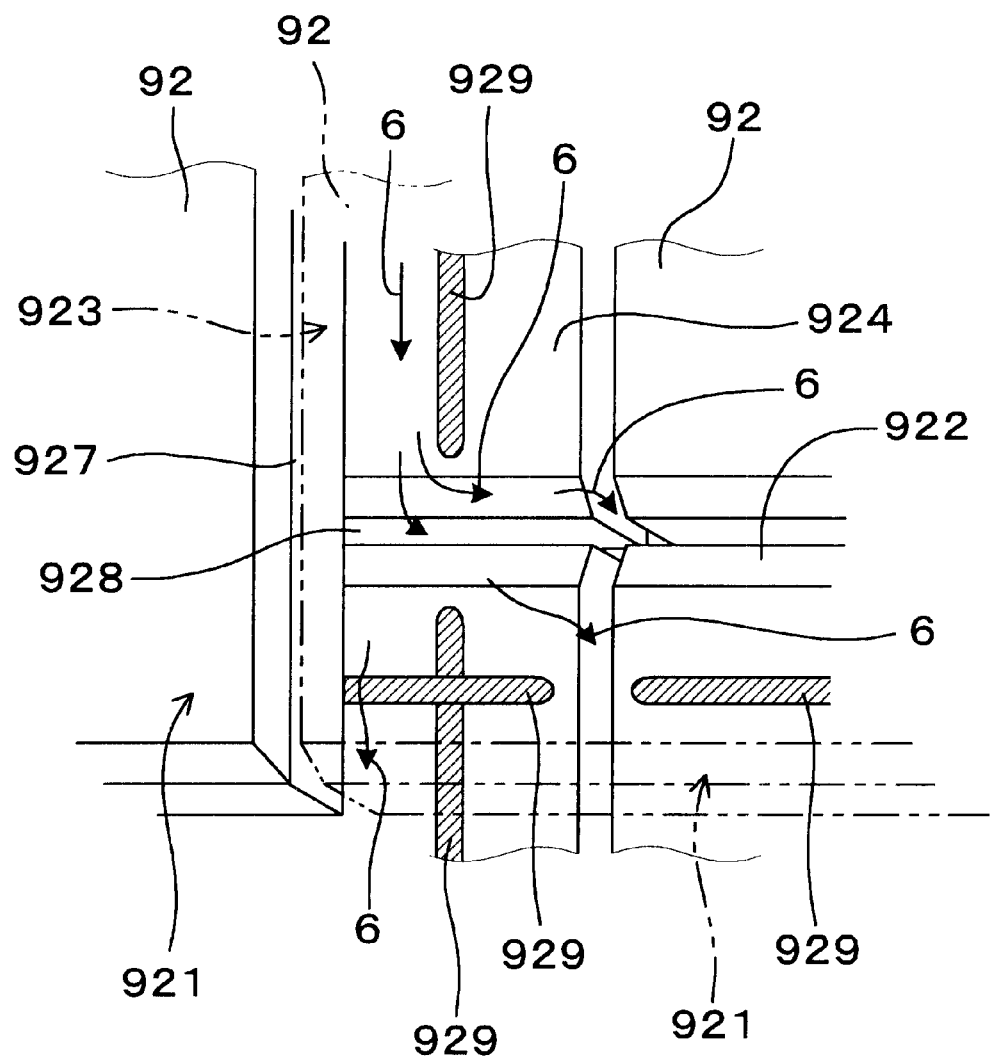
FIG. 17 is an explanatory perspective view for explaining problems of a conventional siding boards attachment structure.
Figure 18:
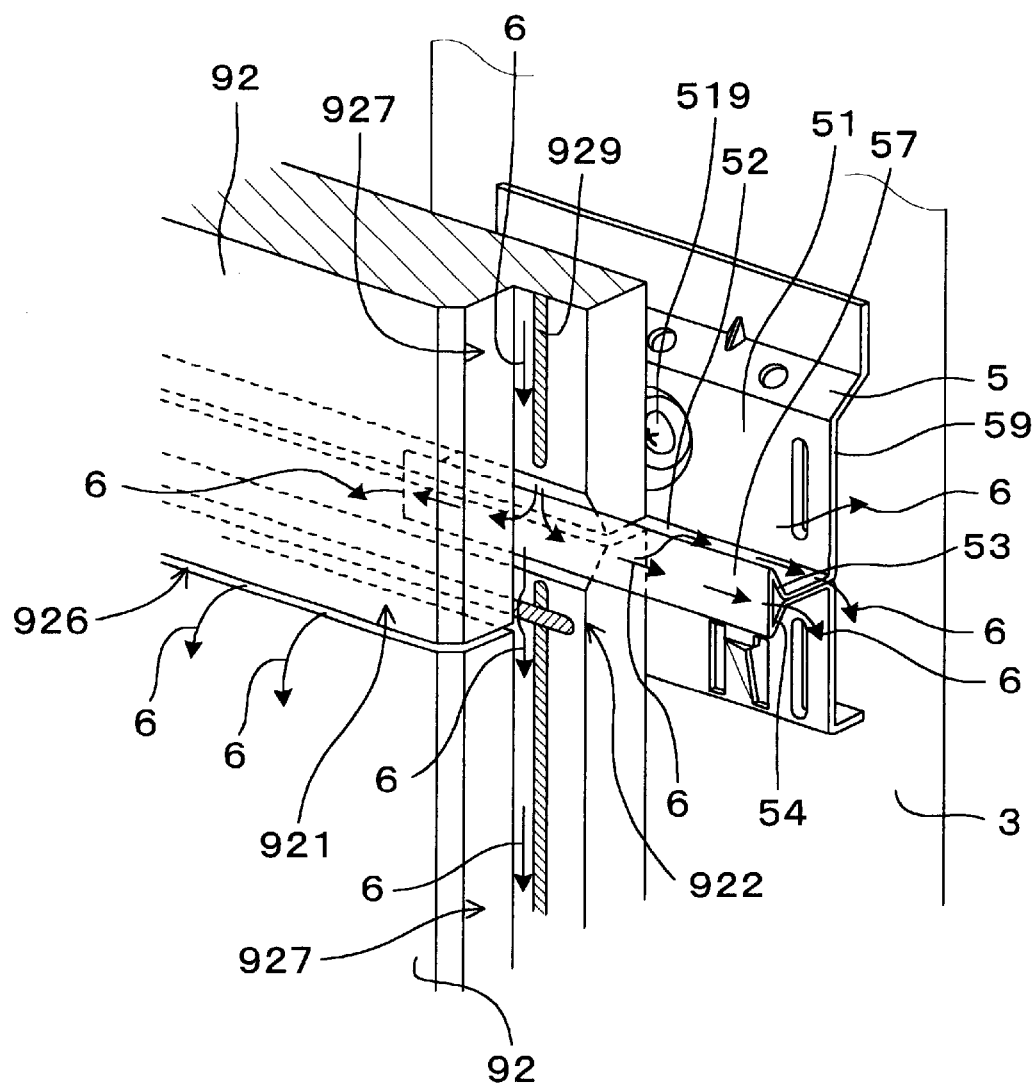
FIG. 18 is an explanatory perspective view for explaining problems of another conventional siding boards attachment structure.

Other portion of the third embodiment has the same working effect as that of the first embodiment Fourth Embodiment As shown in FIG. 15, a fourth embodiment is an example of a siding boards attachment structure 102 in which a sealing member 40 (see FIG. 12) having the base plate portion 41 provided at its front surface with the rear resilient material 45 over the vertical direction is used, and the securing metal fitting 5 is superposed on a front surface of the base plate portion 41 of the sealing member 40.

That is, the siding boards attachment structure 102 is a combination of the siding boards attachment structure 10 of the second embodiment and the siding boards attachment structure 101 of the third embodiment. The rear resilient material 45 is pushed by the securing metal fitting 5 at the superposed portion.

In this case, the working effects of the second and third embodiments are obtained. That is, it is possible to further substantially prevent water from entering the siding boards attachment structure 102, to reduce a securing space of the securing metal fitting 5, and to enhance the construction efficiency.

Other portion of the fourth embodiment has the same working effect as that of the first embodiment.

It is preferable that the sealing member includes a rear resilient material disposed on a front surface of the base plate portion, and the rear resilient material is in tight contact with a back surface of the second row (right) siding board.

With this structure, it is possible to obtain a siding boards attachment structure capable of preventing water from entering inside more substantially.

That is, according to the siding boards attachment structure, the base plate portion of the sealing member, the rear resilient material, the rising plate portion, the front resilient material and the siding board form a water passage (see FIGS. 1 and 13).

Therefore, in the unlikely event that the front resilient material of the front plate portion could not prevent water from entering and rainwater invaded from the gap of the joint portion of the siding boards, the rear resilient material can dam up the rainwater. Then, the rainwater passes through the water passage and falls down, and should not enter the siding boards attachment structure.

Next, it is preferable that the front and rear resilient materials are made of foam materials.

With this feature, it is possible to obtain a siding boards attachment structure capable of preventing rainwater from entering more substantially.

Examples of the foam material are rubber foam material made of, for example, EPDM (ethylene propylene rubber) or the like or plastic foam material made of, for example, polyethylene or the like.

Next, in the sealing member, it is preferable that the base plate portion is sandwiched between a rear portion of the securing metal fitting and the underlayment to secure the sealing member to the underlayment together with the securing metal fitting (see FIGS. 14 and 15).

With this feature, it is possible to obtain a siding boards attachment structure having excellent construction efficiency.

Further, even when a width of the underlayment is narrow, the sealing member and the securing metal fitting can be secured to the underlayment substantially.

It is preferable that the siding board is further provided at the opposite upper and lower sides with an upper underlying tongue portion and a lower overlying tongue portion, respectively, the upper underlying tongue portion protruding along a direction from the lower side to the upper side in the back surface side and the lower overlying tongue portion protruding along a direction from the upper side to the lower side in the front surface side.

With this feature, it is possible to obtain a siding boards attachment structure having excellent outward appearance design and excellent construction efficiency.

Next, it is preferable that a thickness (A) of the siding board from its front inner surface of the notched recess to a front surface of the siding board is substantially equal to a thickness (B) of the lateral overlying tongue portion (See FIG. 3).

With this feature, it is possible to substantially bring the front resilient material into tight contact with the back surfaces of the left and right siding boards in the gap of the joint portion, and the outward appearance design of the siding boards attachment structure can be secured.

That is, in order to secure the outward appearance design, the left and right siding boards are attached to the underlayment such that the front surfaces which become a design surface is substantially flush with each other. At that time, since the thickness (A) and the thickness (B) are substantially the same, the left and right siding boards can be disposed such that the front inner surface of the notched recess and the back surface of the lateral overlying tongue portion are substantially the same plane (see FIG. 1).

With this feature, it is possible to substantially bring the foam resilient material of the sealing member into tight contact with both the front inner surface of the notched recess of each of the siding boards and the back surface of the lateral overlying tongue portion.

Obviously, numerous modifications and variations of the present invention are possible in light of the above teachings. It is therefore to be understood that, within the scope of the appended claims, the invention may be practiced otherwise than as specifically described here.

What is claimed as new and desired to be secured by Letters Patent of the United States is:

1. An siding boards attachment structure, comprising:
    siding boards each having opposite right and left sides and opposite upper and lower sides, each of the siding boards being provided at the opposite right and left sides with a lateral underlying tongue portion and a lateral overlying tongue portion, respectively, the lateral underlying tongue portion protruding along a vertical direction from a left side to a right side in a back surface side of one of the siding boards, a notched recess notched along the vertical direction from a right side to a left side in front of the lateral underlying tongue portion, and the lateral overlying tongue portion protruding along the vertical direction from a right side to a left side in a front surface side of one of the siding boards;
    at least one underlayment to which the siding boards are attached;
    securing metal fittings disposed at the opposite upper and lower sides of the siding boards in order to fix the siding boards;
    at least one sealing member disposed between left and right adjacent ones of the siding boards and disposed continuously with the siding boards attachment structure over the underlayment in the vertical direction, the sealing member including:
        a base plate portion secured to the underlayment;
        a rising plate portion bent forward from the base plate portion and abutting against a side surface of the lateral underlying tongue portion of one of the siding boards;
        a front plate portion bent from a front end of the rising plate portion in an opposite direction from the base plate portion and engaging with a front surface of the lateral underlying tongue portion of one of the siding boards;
        a front resilient material provided on a front surface of the front plate portion, wherein the front resilient material is in tight contact with both a front inner surface of the notched recess of the siding boards and a back surface of the lateral overlying tongue portion of the siding boards; and
        a rear resilient material disposed on a front surface of the base plate portion, wherein the rear resilient material is in tight contact with back surfaces of the siding boards.

2. The siding boards attachment structure according to claim 1, wherein the front resilient material and the rear resilient material are made from foam material.

3. The siding boards attachment structure according to claim 1, wherein the base plate portion is sandwiched between a rear portion of the securing metal fittings and the underlayment to secure the sealing member to the underlayment together with the securing metal fittings.

4. The siding boards attachment structure according to claim 1, wherein one of the siding boards is further provided at the opposite upper and lower sides with an upper underlying tongue portion and a lower overlying tongue portion, respectively, the upper underlying tongue portion protruding along a direction from a lower side to an upper side in the back surface side of one of the siding boards, and the lower overlying tongue portion protruding along a direction from an upper side to a lower side in the front surface side of one of the siding boards.

5. A sealing member used for a siding boards attachment structure in which siding boards each have opposite right and left sides and opposite upper and lower sides and are each provided, at the opposite right and left sides thereof, with a lateral underlying tongue portion and a lateral overlying tongue portion, respectively, the lateral underlying tongue portion protruding along a vertical direction from a left side to a right side in a back surface side of one of the siding boards, a notched recess notched along the vertical direction from a right side to a left side in front of the lateral underlying tongue portion and the lateral overlying tongue portion protruding along the vertical direction from a right side to a left side in a front surface side of one of the siding boards, the sealing member being disposed continuously with the siding boards attachment structure over an underlayment in the vertical direction, and the sealing member comprising:
    a base plate portion configured to be secured to the underlayment;
    a rising plate portion bent forward from the base plate portion and configured to abut against a side surface of the lateral underlying tongue portion of one of the siding boards;
    a front plate portion bent from a front end of the rising plate portion in the opposite direction from the base plate portion and configured to engage with a front surface of the lateral underlying tongue portion of one of the siding boards;
    a front resilient material provided on a front surface of the front plate portion and configured to be in tight contact with a front inner surface of the notched recess of one of the siding boards, and a back surface of the lateral overlying tongue portion of another of the siding boards; and a rear resilient material disposed on a front surface of the base plate portion, wherein the rear resilient material is in tight contact with back surfaces of the siding boards.

6. The sealing member according to claim 5, wherein the front resilient material and the rear resilient material are made from foam material.

7. A siding board used for a siding boards attachment structure in which a sealing member is disposed continuously with the siding boards attachment structure over an underlayment in a vertical direction, wherein the sealing member includes a base plate portion configured to be secured to the underlayment, a rising plate portion bent forward from the base plate portion, a front plate portion bent from a front end of the rising plate portion in an opposite direction from the base plate portion a front resilient material provided on a front surface of the front plate portion, and a rear resilient material disposed on a front surface of the base plate portion and in tight contact with a back surface of the siding board, the siding board comprising:

opposite right and left sides and opposite upper and lower sides;

a lateral underlying tongue portion and a lateral overlying tongue portion at the opposite right and left sides, respectively, of the siding board, the lateral underlying tongue portion protruding along the vertical direction from a left side to a right side in a back surface side of the siding board, and the lateral overlying tongue portion protruding along the vertical direction from a right side to a left side in the front surface side of the siding board; and a notched recess notched along the vertical direction from a right side to a left side in front of the lateral underlying tongue portion and in back of the lateral overlying tongue portion, the notched recess formed such that the front resilient material and the front plate portion of the sealing member are fitted into the notched recess.

8. The siding board according to claim 7, wherein a thickness from a front inner surface of the notched recess to a front surface of the siding board is substantially equal to a thickness of the lateral overlying tongue portion.

9. The siding board according to claim 7, further comprising:

an upper underlying tongue portion and a lower overlying tongue portion at the opposite upper and lower sides, respectively, the upper underlying tongue portion protruding along a direction from a lower side to an upper side in the back surface side of the siding board, and the lower overlying tongue portion protruding along a direction from an upper side to a lower side in the front surface side of the siding board.

10. A method of attaching siding boards in a siding boards attachment structure, wherein each siding board of the siding boards has opposite right and left sides and opposite upper and lower sides and is provided at the opposite right and left sides thereof with a lateral underlying tongue portion and a lateral overlying tongue portion, respectively, the lateral underlaying tongue portion protruding along a vertical direction from a left side to a right side in a back surface side of each siding board, the lateral overlying tongue portion protruding along the vertical direction from a right side to a left side in a front surface side of each siding board, a notched recess extending along the vertical direction from a right side to a left side in front of the lateral underlying tongue portion and in back of the lateral overlying tongue portion, and a sealing member disposed continuously with the siding boards attachment structure over an underlayment in the vertical direction, the sealing member including a base plate portion configured to be secured to the underlayment, a rising plate portion bent forward from the base plate portion, a front plate portion bent from a front end of the rising plate portion in an opposite direction in front of the base plate portion, and a front resilient material provided on a front surface of the front plate portion, the method comprising:

disposing securing metal fittings on the opposite upper and lower sides of a first row siding board;

disposing the first row siding board on the underlayment using the securing metal fittings;

bringing the rising plate portion of the sealing member into abutment against the lateral overlying tongue portion of the first row siding board;

engaging the front plate portion of the sealing member with a front surface of the lateral underlying tongue portion;

fitting the front resilient material and the front plate portion of the sealing member into the notched recess of the first row siding board;

bringing the front resilient material into tight contact with a front inner surface of the notched recess;

securing the sealing member to the underlayment;

disposing the securing metal fittings on the opposite upper and lower sides of a second row siding board;

disposing the second row siding board to the underlayment such that the sealing member is sandwiched between the first row siding board and the second row siding board;

bringing the front resilient material into tight contact with a back surface of the lateral overlying tongue portion of the second row siding board; and bringing a back surface of the second row siding board into tight contact with a rear resilient material which is disposed on a front surface of the base plate portion.

11. The method of attaching siding boards according to claim 10, further comprising:

sandwiching the base plate portion between a rear portion of the securing metal fittings and the underlayment to secure the sealing member to the underlayment together with the securing metal fittings.

12. The method of attaching siding boards according to claim 10, wherein each siding board of the siding boards is further provided at the opposite upper and lower sides thereof with an upper underlying tongue portion and a lower overlying tongue portion, respectively, the upper underlying tongue portion protruding along a direction from a lower side to an upper side in the back surface side of each siding board, and the lower overlying tongue portion protruding along a direction from an upper side to a lower side in the front surface side of each siding board.

* * * * *